(12) United States Patent
Clubley et al.

(10) Patent No.: US 9,362,713 B2
(45) Date of Patent: Jun. 7, 2016

(54) MOPA WITH HIGH-GAIN SOLID-STATE AMPLIFIER

(71) Applicant: Coherent Scotland Limited, Glasgow (GB)

(72) Inventors: David Clubley, Glasgow (GB); Burly Cumberland, Glasgow (GB)

(73) Assignee: Coherent Scotland Limited, Glasgow (GB)

( * ) Notice: Subject to any disclaimer, the term of this patent is extended or adjusted under 35 U.S.C. 154(b) by 0 days.

(21) Appl. No.: 14/736,764

(22) Filed: Jun. 11, 2015

(65) Prior Publication Data
US 2016/0006207 A1    Jan. 7, 2016

(51) Int. Cl.
| | |
|---|---|
| H01S 3/11 | (2006.01) |
| H01S 3/16 | (2006.01) |
| H01S 3/23 | (2006.01) |
| H01S 3/091 | (2006.01) |
| H01S 3/06 | (2006.01) |
| G02B 27/09 | (2006.01) |

(52) U.S. Cl.
CPC ............ *H01S 3/11* (2013.01); *H01S 3/0602* (2013.01); *H01S 3/091* (2013.01); *H01S 3/1673* (2013.01); *G02B 27/0927* (2013.01); *H01S 3/2308* (2013.01)

(58) Field of Classification Search
CPC ........ H01S 3/11; H01S 3/0602; H01S 3/1673
See application file for complete search history.

(56) References Cited

U.S. PATENT DOCUMENTS

| | | | | |
|---|---|---|---|---|
| 5,761,227 A | * | 6/1998 | Hargis | H01S 3/042 372/22 |
| 8,995,052 B1 | | 3/2015 | Knappe et al. | |
| 2004/0101015 A1 | * | 5/2004 | Butterworth | H01S 3/09415 372/70 |
| 2008/0151954 A1 | * | 6/2008 | Lynn | C30B 15/36 372/41 |
| 2010/0061412 A1 | * | 3/2010 | Reed, Jr. | H01S 3/09415 372/29.02 |
| 2011/0164649 A1 | * | 7/2011 | Xuan | H01S 3/1312 372/75 |

FOREIGN PATENT DOCUMENTS

EP      2713457 A2    4/2014

OTHER PUBLICATIONS

Ogilvy et al. "Efficient diode double-end-pumped Nd:YVO4 laser operating at 1342nm", Optics express vol. 11, No. 19, pp. 2411-2415 (2003).*
Office Action received for United Kingdom Patent Application No. 1411926.7, mailed on Dec. 15, 2014, 5 pages.
Atchley et al., "VBG Upper-State Pumping Benefits DPSS Lasers", Laser Focus World, vol. 49, No. 3, Mar. 2013, pp. 52-55.

* cited by examiner

*Primary Examiner* — Eric Bolda
(74) *Attorney, Agent, or Firm* — Morrison & Foerster LLP

(57) ABSTRACT

Radiation from a VBG-locked diode-laser at a locked wavelength of 878.6 nm is focused into a 30-mm long Nd:YVO$_4$ optical amplifier crystal for optically pumping the crystal (24). The crystal amplifies a beam of seed-pulses from a fiber MOPA (12). The power of pump radiation is about 75 Watts. The radiation is focused into a beam-waist having a minimum diameter of about 600 micrometers. This provides an amplifier having a high gain-factor well over 100. The high-gain factor provides a gain-shaping effect on the seed-pulse beam which overcomes thermal aberrations inherent in such high-power pumping, thereby producing an amplified seed-pulse beam with $M^2$ less than 1.3.

19 Claims, 3 Drawing Sheets

MOPA WITH HIGH-GAIN SOLID-STATE AMPLIFIER

CROSS REFERENCE TO RELATED APPLICATION

This application claims the priority benefit of United Kingdom Patent Application No. GB1411926.7, filed on Jul. 3, 2014, the content of which is incorporated by reference herein in its entirety for all purposes.

TECHNICAL FIELD OF THE INVENTION

The present invention relates in general to laser master-oscillator power-amplifier (MOPA) apparatus. The invention relates in particular to a MOPA apparatus including a fiber-laser for generating seed-pulses in a picosecond (ps) range, and a diode-laser pumped (diode-pumped) neodymium-doped yttrium vanadate (Nd:YVO$_4$) solid-state (bulk) amplifier for amplifying the seed-pulses to provide amplified ps pulses having a wavelength of about 1064 nanometers (nm).

DISCUSSION OF BACKGROUND ART

MOPA apparatus delivering 1064-nm picosecond pulses is now extensively used for operations such as laser marking. The range of operations that can be addressed by such MOPA apparatus is greater, the greater the energy and average power of the pulse. A preferred arrangement of such apparatus includes a mode-locked fiber-laser or all-fiber MOPA, providing seed-pulses for amplification. This typically uses ytterbium-doped (Yb-doped) gain-fiber. The seed-pulses are then amplified in a diode-pumped bulk solid-state amplifier, typically having a gain element of Nd:YVO$_4$. Typically, the gain-element is end-pumped, i.e., with a pump-beam coaxial with a seed-pulse beam.

Typical prior-art design of diode-pumped Nd:YVO$_4$ solid-state amplifier, end-pumped with pump-radiation power greater than or equal to about 50 Watts (W), revolves around distributing absorption of pump-radiation in order to distribute the heat-load in the crystal and minimize the effects of thermal lensing. In addition, the pump-spot size (minimum radius in the gain-element of a beam from the diode-laser) is normally chosen to maximize a spatial overlap between the pump-beam and the seed for a given brightness of diode-laser radiation in order to optimize extraction efficiency. These amplifiers are usually designed for power amplification and typically provide a gain-factor less than 10, usually between about 1.5 and 3.

Initially, Nd:YVO$_4$ gain-elements were pumped with diode-laser radiation having a wavelength of about 808 nm. Nd:YVO$_4$, however, is a uniaxial strongly birefringent crystal material, with radiation at the 808 nm peak being much more strongly absorbed in the crystal c-axis that in the crystal a-axis. This caused problems with crystal breakage under high power due to differential absorption. This was mitigated by pumping at an "off-peak" wavelength, for example 815 nm at which absorption is the same in both crystal-axes albeit less than at the 808-nm peak.

In later developments, pumping has been effected at another Nd:YVO$_4$ peak-absorption wavelength of 880 nm. This longer wavelength takes advantage of a reduced quantum defect (difference between pump-photon energy and emitted-photon energy) to reduce heat-load and allow for an increase in pump-power. At 880 nm, however, there is a polarization (crystal-axis) dependence of absorption similar to that at 808 nm. This has led to a selection of 878.6 nm as a compromise pump-radiation wavelength at which the crystal-axis absorption-difference is less than at the 888 nm peak, albeit not zero. A brief description of 878.6-nm pumping of Nd:YVO$_4$ is presented in very general terms in an article "*VBG Upper-State Pumping Benefits DPSS Lasers*", in Laser Focus World, Volume 49, Issue No. 3.

This 878.6 nm (or 888-nm) pumping-wavelength is typically combined with an increase in the pump-spot radius and brightness to optimize the absorption length of radiation in the crystal. This reduces the maximum temperature reached in the crystal and associated thermal aberrations. Further, overlap between the pump-beam and the seed-pulse beam is optimized along the entire length of the gain-element to maximize extraction-efficiency (emission output-power/input pump-power).

This is illustrated in FIG. 1, which is a reproduction of a Gaussian ray-trace schematically illustrating the form and dimensions of the focused pump-radiation beam relative to the form and dimensions of a seed-pulse beam in a prior-art amplifier Nd:YVO$_4$ gain-element. Here, it should be noted that longitudinal dimensions are shown foreshortened relative to lateral dimensions for convenience of illustration. A focused pump beam is depicted bounded by bold solid lines having the well-known hyperbolic form of a focused, Gaussian-propagation beam. A collimated seed-pulse beam is depicted by bold dashed lines.

The beam-waist diameter is $2\omega_0$, i.e., twice the minimum beam-radius $\omega_0$. Typically the beam-waist diameter would be between about 0.8 millimeters (mm) and about 1.5 mm. A beam-waist length $L_W$ is measured between points at which the focused beam has a diameter $\sqrt{2}$ (about 1.414) times $2\omega_0$. The beam-waist minimum is located at about the center of the crystal. It can be seen that, in this example $L_W$ is greater than the crystal length $L_C$.

These relationships are dictated by the above-discussed goal of maximizing the overlap (volume ratio) in the crystal of the pump-beam and the seed-pulse beam for maximizing gain-extraction. In the example of FIG. 1, the overlap is about 70%. The relative large minimum beam-diameter is selected as discussed above to minimize thermal effects in the crystal, for minimizing seed-pulse beam aberration.

It is believed that a solid-state amplifier adaptable to a wide range of applications should be capable of handling pulse-energies up to 100 microjoules (µJ). In order to be effective for relatively low-power seed-pulses, for example, pulses having a pulse-energy of a few nanojoules (nJ), would require a gain-factor greater than 100, preferably between about 10,000 and 100,000. It is believed the even a gain-factor of 100 is far greater than has been hitherto achieved in a diode-pumped Nd:YVO$_4$ solid-state amplifier. Applicants were not able to come close to producing such a high gain-factor by following the above-discussed "conventional wisdom" for solid-state amplifier design, at 878.6 nm or any other pump-radiation wavelength. Furthermore, even at modest levels of amplification, a degradation in the amplified beam quality was often observed, limiting the scalability of this prior-art approach.

SUMMARY OF THE INVENTION

In one aspect, laser master oscillator power amplifier apparatus in accordance with the present invention comprises a source of seed-pulses having a duration between about 1 picoseconds and about 30 picoseconds and a pulse energy between about 0.5 and 5 nanojoules. The seed-pulses are characterized as having a seed-pulse beam. A neodymium-doped yttrium vanadate crystal is provided for amplifying the seed-pulses. The crystal has a crystal length and an entrance face and an exit face. The seed-pulse beam enters the crystal via the entrance-face and exits the crystal via the exit-face. The seed-pulse beam has a diameter which is about constant within the crystal. A source of CW optical pump-radiation having a wavelength of about 878.6 nanometers is provided. At least one optical element is arranged to focus the pump-radiation into a beam-waist coaxial with the seed-pulse beam. The beam-waist has a minimum diameter about at the entrance face of the crystal, and has a beam waist-length defined as the distance between points on opposite sides of the minimum diameter where the beam waist is about 1.414 times the minimum diameter. The neodymium-doped yttrium vanadate crystal has a neodymium-doping concentration between about 0.12% and about 0.2%. The pump-beam has a diameter between about 1-times and about 1.5-times seed-pulse beam diameter at the entrance-face of the crystal, and greater than or equal to three-times the seed-pulse beam diameter at the exit face of the crystal. The CW pump-radiation has a power about equal to or greater than 50 W.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 2:
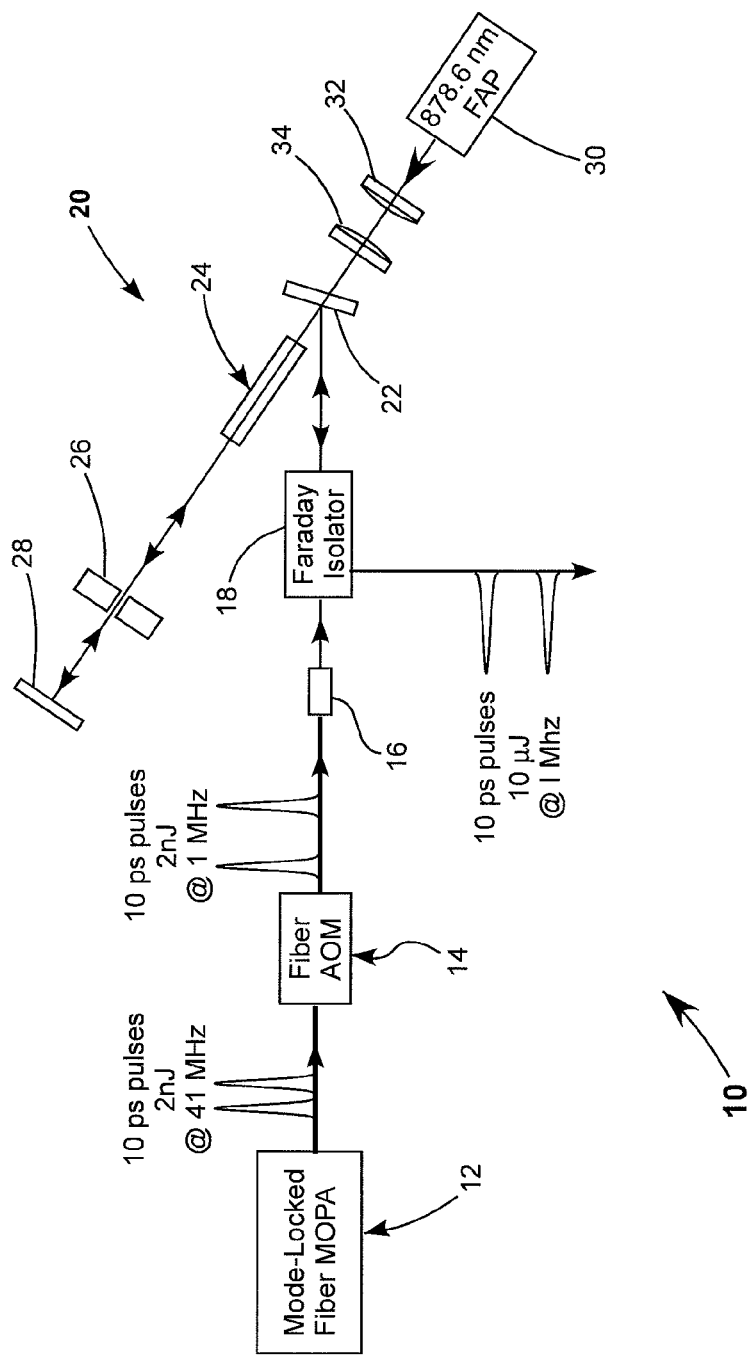
FIG. 2 schematically illustrates a preferred embodiment of MOPA apparatus in accordance with the present invention, including a mode-locked fiber MOPA delivering seed-pulses an acousto-optic modulator for selecting pulses from the MOPA to be amplified with the pulses to be delivered to a double-pass solid-state amplifier including a Nd:YVO$_4$ gain-element end-pumped by focused pump-radiation having a wavelength of 878.6 nm from a diode-laser fiber array package.

Referring now to the drawings, wherein like components are designated by like reference numerals, FIG. 2 schematically illustrates a preferred embodiment 10 of MOPA apparatus in accordance with the present invention. In FIG. 2 optical fiber connections between components are depicted by bold solid lines, and free-space beam paths are depicted by fine solid lines.

Apparatus 10 includes a mode-locked fiber MOPA 12, which is arranged to deliver a first train of optical pulses having a duration of between about 1 ps and 30 ps and a pulse energy of between about 0.5 and about 5 nJ at a repetition frequency (PRF) of between about 10 megahertz (MHz) and 100 MHz. In a preferred example the PRF is 41 MHz and the pulse-energy is about 2 nJ. These pulses are transported to a fiber acousto-optic modulator (AOM) 14, which selectively transmits pulses from the first train thereof to provide a second train of pulses having the same pulse parameters in the first train but at a significantly lower PRF, between about 50 kilohertz kHz and about 1 MHz. An AOM used in this way is often referred to as a "pulse-picker" by practitioners of the art. The path of pulses discarded by AOM 14 is not shown for simplicity of illustration.

Seed-pulses in the second train thereof are collimated into free-space by a fiber collimating lens 16. The pulses are transmitted in a forward-pass through a Faraday isolator 18 to a turning-mirror 22 which directs the pulses into a Nd:YVO$_4$ gain-element (crystal) 24 preferably having a Nd doping-concentration between about 0.12% and about 0.2% and a length greater than about 15 mm, and preferably about 20 mm or greater.

Crystal 24 is energized by continuous-wave (CW) 878.6 nm radiation from a volume Bragg grating (VBG) wavelength locked fiber-array package (FAP). In such a package, radiation from a diode-laser array is coupled into an optical fiber for delivery. VBG-locked diode-lasers are commercially available, for example, from nLight of Vancouver, Wash., USA.

The fiber-coupled radiation is focused, here by plano-convex lenses 32 and 34, with the focused beam being transmitted through turning mirror 22 into Nd:YVO$_4$ crystal 24. Details of the focusing relative to the crystal geometry and seed-pulse beam-dimensions are discussed in detail further herein below.

Seed-pulses and pump-radiation are transmitted through crystal 24 in a forward pass. The transmitted seed-pulses are in a nominally collimated beam and the pump-radiation is in a diverging beam after being focused into the crystal. The transmitted pump-radiation is intercepted by an absorbing aperture stop 26. The seed-pulse beam is reflected by an end-mirror 28 and returned through aperture 26 to be further amplified in a reverse pass through crystal 24. The further amplified seed-pulses are directed by turning mirror 22 back into Faraday isolator 18, which directs the amplified seed-pulses out of apparatus 10 as output-pulses.

Figure 1:
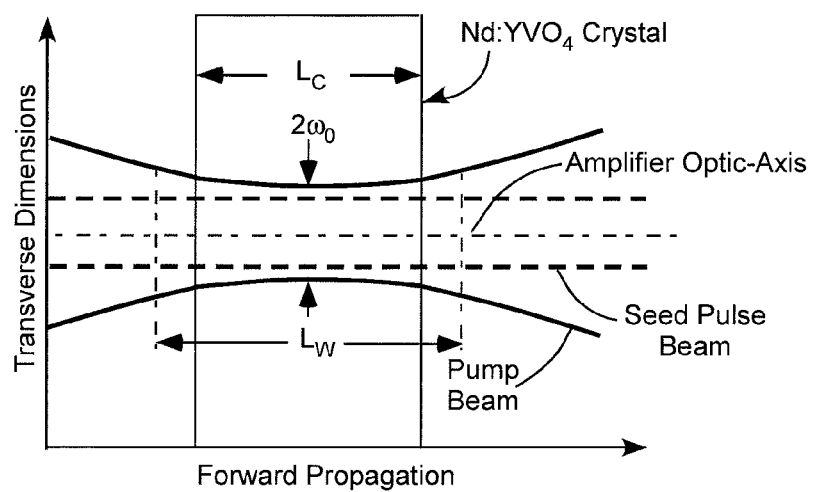
FIG. 1 is a reproduction of a Gaussian ray-trace schematically illustrating the form and dimensions of the focused pump-radiation beam relative to the form and dimensions of a seed-pulse beam in a prior-art amplifier Nd:YVO$_4$ gain-element.
Figure 3:
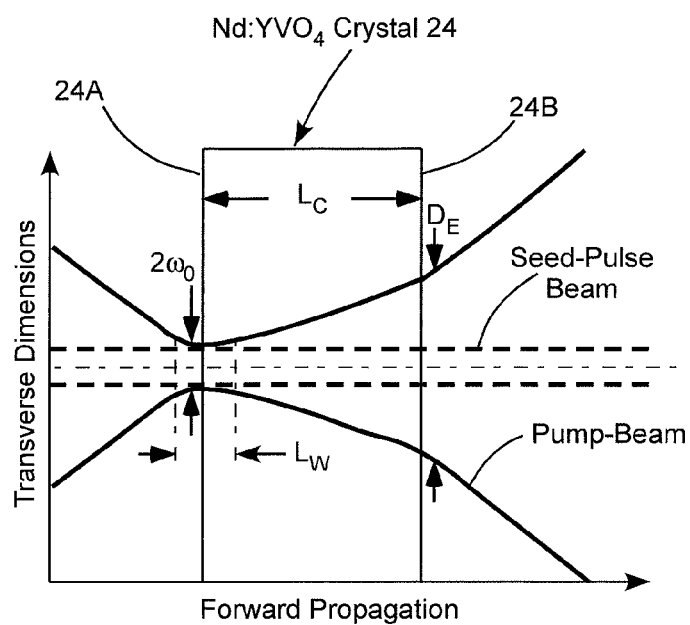
FIG. 3 is a reproduction of a Gaussian ray-trace schematically illustrating the form and dimensions of the focused pump-radiation beam relative to the form and dimensions of a seed-pulse beam in the Nd:YVO$_4$ gain-element of the apparatus of FIG. 1.

FIG. 3 is a reproduction of a Gaussian propagation ray-trace schematically illustrating interaction of the seed-pulse beam and the pump-beam, about coaxial with each other, in Nd:YVO$_4$ crystal 24 of apparatus 10. As in the ray-trace of FIG. 1, longitudinal dimensions are shown foreshortened relative to lateral dimensions for convenience of illustration. The crystal-length $L_C$ is preferably equal to or greater than 20 mm, and preferably about 30 mm. The beam-waist length $L_W$ (measured between the √2 times $2\omega_0$ points) of the pump-beam is preferably less than one-half of the crystal length $L_C$ and preferably about one-quarter of $L_C$. The pump-beam waist is preferably located about at entrance-face 24A of crystal 24. Beam-waist diameter $2\omega_0$ is preferably less than 0.65 mm and between about 1.0-times and about 1.5-times the seed-pulse beam-diameter. The pump-beam diameter ($D_E$) at exit-face 24B of crystal 24 is greater than about three-times seed-pulse beam diameter, and preferably about four-times the seed-pulse beam diameter, which is about constant over the range of the ray-trace.

In a practical example of the present invention, with crystal 24 having a length of about 30 mm with Nd-doping concentration of 0.17%, and with 878.6-nm pump-beam power of about 75 Watts (W), beam-waist diameter $2\omega_0$ is about 600 micrometers (μm) and $D_E$ is about 2.3 mm. 10 ps input pulses (from AOM 14) having a pulse-energy of 2 nJ and a PRF of 1 MHz were amplified to provide amplified output pulses have a pulse-energy of 10 μJ. That is representative of an amplifier gain of about 5000. Average power output is 10 W, representative of about 13% extraction efficiency. A minimum pump-power effective in the present invention is about 50 Watts.

This remarkable result is realized while still achieving excellent quality in the amplified beam. In the above-described example the beam-quality (mode-quality) $M^2$ was less than 1.3, with lower $M^2$ representing higher beam-quality, as is known in the art. It is believed, without being limited to any particular hypothesis, that this is due to gain-shaping in the highly concentrated, focused pump-beam in the crystal effectively "healing" any thermal distortion that is produced. Further, it is believed that this gain-shaping is able to create an output beam with $M^2$ less than 1.3 for an input seed-pulse beam having $M^2$ greater than about 2.2. The low extraction efficiency is more than compensated by the result.

It is traditionally believed that a doping level significantly greater than 0.2% is necessary to provide gain-shaping. Such a high doping-concentration, however, is accompanied by secondary effects, such as quenching and amplified stimulated emission (ASE), which have an adverse effect on mode-quality. In the present invention, these secondary effects are minimized by keeping the doping concentration below the 0.2% upper limit and achieving the gain-shaping instead by using the concentrated pump-spot (beam-waist) described above with reference to FIG. 3.

The invention could be empirically described as utilizing a VBG locked diode-laser with locked wavelength of 878.6 nm to maximize the absorbed power over a length of Nd:YVO$_4$ crystal in order to allow the pump-spot size to be minimized for producing a very-high-gain amplifier under high-power pumping. The high gain is utilized to provide a gain-shaping effect on the seed-pulse beam in order to overcome the thermal aberrations inherent in such high-power pumping, thereby producing an amplified beam with excellent mode-quality.

In conclusion, the present invention is described above with reference to a preferred embodiment. The invention, however, is not limited to the embodiment described and depicted therein. Rather the invention is limited only by the claims appended, hereto.

What is claimed is:

1. Laser master oscillator power amplifier apparatus, comprising:
    a source of seed-pulses having a duration between about 1 picosecond and about 30 picoseconds and a pulse-energy between about 0.5 and 5 nanojoules the seed-pulses characterized as having a seed-pulse beam;
    a neodymium-doped yttrium vanadate crystal for amplifying the seed-pulses, the crystal having a crystal length and an entrance face and an exit face, and the seed-pulse beam entering the crystal via the entrance-face and exiting the crystal via the exit-face and having a diameter which is about constant within the crystal;
    a source of CW optical pump-radiation having a wavelength of about 878.6 nanometers;
    at least one optical element arranged to focus the pump-radiation into a beam-waist coaxial with the seed-pulse beam, the beam-waist having a minimum diameter about at the entrance face of the crystal, and the beam-waist having a beam waist-length defined as the distance between points on opposite sides of the minimum diameter where the beam waist-length is about 1.414 times the minimum diameter; and wherein
    the neodymium-doped yttrium vanadate crystal has a neodymium-doping concentration between about 0.12% and 0.2%, the pump-beam has a diameter between about 1 and 1.5-times the seed-pulse beam diameter at the entrance-face of the crystal and greater than or equal to about three-times the seed-pulse beam diameter at the exit face of the crystal, and the CW pump-radiation has a power about equal to or greater than about 50 Watts.

2. The apparatus of claim 1, wherein the beam-waist length is less than about one-half the crystal length.

3. The apparatus of claim 1, further including a mirror arranged such the seed-pulse beam having traversed the neodymium-doped yttrium vanadate crystal in a forward pass is reflected therefrom and transmitted back through the crystal to be further amplified.

4. The apparatus of claim 3, wherein the further-amplified pulses have a pulse-energy between about 5 and 100 microjoules.

5. The apparatus of claim 1, wherein the crystal length is great than about 15 millimeters.

6. The apparatus of claim 1, wherein the crystal length is about 30 mm.

7. The apparatus of claim 1, wherein seed-pulse beam amplified by the neodymium-doped yttrium vanadate crystal has a beam-quality $M^2$ less about equal to or less than 1.3.

8. The apparatus of claim 7, wherein the seed-pulse beam prior to amplification by the neodymium-doped yttrium vanadate crystal has a beam-quality $M^2$ greater than about 2.2.

9. The apparatus of claim 1, wherein the beam-waist diameter about at the entrance face of the neodymium-doped yttrium vanadate crystal is about 0.6 millimeters.

10. A method of generating amplified laser pulse from a master oscillator power amplifier device wherein the power amplifier includes a neodymium-doped yttrium vanadate crystal having a neodymium-doping concentration between about 0.12% and 0.2%, said method comprising the steps of;
    generating seed pulses from the master oscillator, said seed-pulses having a duration between about 1 picosecond and about 30 picoseconds and a pulse-energy between about 0.5 and 5 nanojoules, the seed-pulses characterized as having a seed-pulse beam;
    directing the seed pulse beam into the neodymium-doped yttrium vanadate crystal;
    optically pumping the neodymium-doped yttrium vanadate crystal with CW optical pump radiation having a wavelength of about 878.6 nanometers, said pump radiation being focused into a beam-waist coaxial with the seed-pulse beam, the beam-waist having a minimum diameter about at an entrance face of the neodymium-doped yttrium vanadate crystal, the pump-beam has a diameter between about 1 and 1.5-times the seed-pulse beam diameter at the entrance-face of the crystal and greater than or equal to about three-times the seed-pulse beam diameter at an exit face of the crystal.

11. The method of claim 10 wherein the CW pump-radiation has a power about equal to or greater than about 50 Watts.

12. The method of claim 10, wherein pump beam has a waist-length defined as the distance between points on opposite sides of the minimum diameter where the beam waist-length is about 1.414 times the minimum diameter and wherein the beam-waist length is less than about one-half the crystal length.

13. The method of claim 10, further including the step of causing the seed pulse beam to make both a forward and backward pass through the neodymium-doped yttrium vanadate crystal to further amplify the seed pulses.

14. The method of claim 13, wherein the further-amplified seed pulses have a pulse-energy between about 5 and 100 microjoules.

15. The method of claim 10, wherein the crystal length is great than about 15 millimeters.

16. The method of claim 10, wherein the crystal length is about 30 millimeters.

17. The method of claim 1, wherein seed-pulse beam amplified by the neodymium-doped yttrium vanadate crystal has a beam-quality $M^2$ less about equal to or less than 1.3.

18. The method of claim 17, wherein the seed-pulse beam prior to amplification by the neodymium-doped yttrium vanadate crystal has a beam-quality $M^2$ greater than about 2.2.

19. The method of claim 10, wherein the beam-waist diameter about at the entrance face of the neodymium-doped yttrium vanadate crystal is about 0.6 millimeters.

* * * * *